(12) United States Patent
Pettersson

(10) Patent No.: US 12,345,366 B2
(45) Date of Patent: Jul. 1, 2025

(54) COMBINATION OF SPLIT PLATE AND SLEEVE, AND A SLEEVE

(71) Applicant: Roxtec AB, Karlskrona (SE)

(72) Inventor: Ronnie Pettersson, Karlskrona (SE)

(73) Assignee: Roxtec AB, Karlskrona (SE)

( * ) Notice: Subject to any disclaimer, the term of this patent is extended or adjusted under 35 U.S.C. 154(b) by 362 days.

(21) Appl. No.: 18/007,509

(22) PCT Filed: May 24, 2021

(86) PCT No.: PCT/SE2021/050485
§ 371 (c)(1),
(2) Date: Dec. 1, 2022

(87) PCT Pub. No.: WO2021/246932
PCT Pub. Date: Dec. 9, 2021

(65) Prior Publication Data
US 2023/0235836 A1  Jul. 27, 2023

(30) Foreign Application Priority Data
Jun. 2, 2020 (SE) .................... 2050633-3

(51) Int. Cl.
*F16L 5/10* (2006.01)
*H02G 3/22* (2006.01)

(52) U.S. Cl.
CPC . *F16L 5/10* (2013.01); *H02G 3/22* (2013.01)

(58) Field of Classification Search
CPC ..... H02G 3/22; H02G 3/24; F16L 5/00; F16L 5/02; F16L 5/10; F16J 15/50
See application file for complete search history.

(56) References Cited

U.S. PATENT DOCUMENTS 4,407,023 A * 10/1983 Norton ............... F16L 5/10
285/193
5,144,777 A * 9/1992 Fishel ............... E04F 19/08
52/220.8
(Continued)

FOREIGN PATENT DOCUMENTS

EP        3392988 A1   10/2018
KR        200458928 Y1  3/2012
WO     2005045294 A2   5/2005

OTHER PUBLICATIONS

Swedish Search Report for Application No. 2050633-3 mailed on Nov. 17, 2020 (2 pages).

(Continued)

Primary Examiner — Gilbert Y Lee
(74) Attorney, Agent, or Firm — Merchant & Gould P.C.

(57) ABSTRACT

Combination of a plate and a sleeve (1, 34) to be received at an opening of a transition. The plate is a split plate (2, 35) formed of two plate parts, forming an opening when joined to each other. The sleeve (1, 34) has a through opening to be placed in line with the opening of the transition and the opening of the split plate (2, 35). Said through opening of the sleeve (1, 34) is adapted to receive a seal. The sleeve (1, 34) is formed of a number layers. Each layer is formed of two sleeve elements (3, 12, 19, 23, 36, 45, 52). Each sleeve element (3, 12, 19, 23, 36, 45, 52) used to form the layers of the sleeve (1, 34) has a general form by means of which an opening is formed when two sleeve elements (3, 12, 19, 23, 36, 45, 52) of each layer are brought together.

18 Claims, 2 Drawing Sheets

(56) References Cited

U.S. PATENT DOCUMENTS

| | | | |
|---|---|---|---|
| 6,394,464 | B1 | 5/2002 | Moreau |
| 7,645,946 | B2 * | 1/2010 | Smith ...................... H02G 3/22 |
| | | | 174/67 |
| 2007/0221792 | A1 | 9/2007 | Kauppila |
| 2011/0041432 | A1 | 2/2011 | Colwell et al. |
| 2011/0121567 | A1 | 5/2011 | Gentile, Jr. et al. |

OTHER PUBLICATIONS

International Search Report for PCT/SE2021/050485 dated Aug. 2, 2021 (3 pages).
Written Opinion of the International Searching Authority for PCT/SE2021/050485 (6 pages).

* cited by examiner

COMBINATION OF SPLIT PLATE AND SLEEVE, AND A SLEEVE

This application is a National Stage Application of PCT/SE2021/050485, filed 24 May 2021, which claims benefit of Serial No. 2050633-3, filed 2 Jun. 2020 in Sweden, and which applications are hereby incorporated by reference in their entireties. To the extent appropriate, a claim of priority is made to each of the above disclosed applications.

TECHNICAL FIELD

The present application concerns a combination of a split plate and a sleeve placed at a partition. It also concerns a sleeve as such. The sleeve is to receive one or more cables, wires or pipes passing through the partition in a sealed way.

BACKGROUND

Whenever one or more pipes, cables or wires is to pass some kind of partition it is common to have a sealed transit. This can be arranged in many different ways. In one example a sleeve is arranged in line with an opening in the partition to receive the one or more pipes, cables or wires. The sleeve may be arranged on a plate, which plate in turn is attached to the partition in some way, often by means of welding. The sleeve is then receiving the one or more cables etc. in a sealed way by means of a seal received inside the sleeve. In some embodiments the sleeve is welded to a plate, which in turn is welded to the partition.

The partition may be placed in many different environments, such as for cabinets, technical shelters, junction boxes and machines and also decks and bulkheads of ships. It may be in different industrial environments, such as automotive, telecom, power generation and distribution as well as marine and offshore.

The sleeve, with the seal, and its connection to the partition should fulfil demands regarding water tightness and fire safety. In welding of the sleeve to the partition or to a plate, there is a risk that deformations are formed. The sleeves are normally provided in some standard sizes.

SUMMARY

By providing a sleeve and a plate that are connected to each other by screw means and whereby the plate is connected to a partition by screw means, possible deformation caused by welding is avoided. Further, by providing the sleeve in a modular form, it can be easily adapted to different demands such as different heights and different fastening means. Further, it is possible to replace only broken parts if needed and, thus, it is not necessary to replace a complete sleeve. It is also possible to use demounted parts to form a new sleeve.

By forming the plate as a split plate and the sleeve as an openable sleeve, it is possible to retrofit the plate and sleeve.

The above features are accomplished with the combination of claim 1 and with a sleeve according to claim 10.

Further objects and advantages of the present invention will be obvious to a person skilled in the art when reading the detailed description below.

BRIEF DESCRIPTION OF THE DRAWINGS

The invention will be described further below by way of examples and with reference to the enclosed drawings. In the drawings.

DETAILED DESCRIPTION

Figure 1:
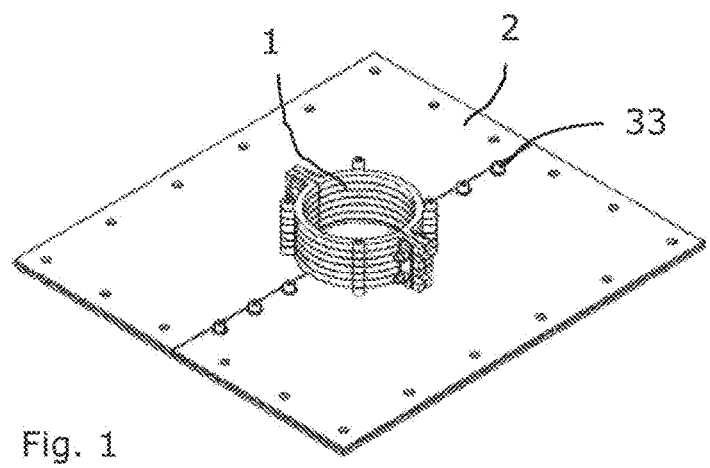
FIG. 1 is a perspective view of a combination of plate and modular sleeve.
Figure 2:
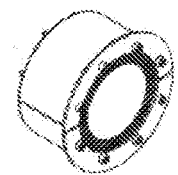
FIG. 2 is a perspective view of one example of a seal device that could be received inside the sleeve of FIG. 1.

In the example of FIG. 1 a sleeve 1 is attached to a split plate 2. The split plate 2 is to be attached to some kind of partition. The sleeve 1 has a through opening for receiving a seal of some kind, such as for example the seal shown in FIG. 2. It could be a seal for single or multiple pipes, cables and wires. Seals of this kind are well known to a person skilled in the art. As the exact design of the seal is of no importance for the present invention, it will not be discussed further here. The split plate 2 is formed of two plate parts. Each plate part has a part of an opening on one side. In the shown embodiments said part of an opening has the form of a semi-circular recess. The sides of the plate parts having the semi-circular recess are to be placed next to each other, whereby a circular opening will be formed in the split plate 2. Each plate part has a thinner portion at the side to be placed against the other plate part, in order to form an overlap joint. Normally a sealing compound is placed in the joint between the plate parts, whereby the plate parts are held together by screws 33. The plate part opposite a head of each screw 33 has a threaded opening for cooperation with a thread of the screw 33. The sleeve 1 is to be placed at and around said circular opening in the split plate 2, whereby there will be a through opening through the sleeve 1 and the split plate 1.

The plate is to be fastened to the partition by screw means.

The sleeve 1 is formed of a number of separate sleeve elements 3, 12, 19, 23. Each shown sleeve element 3, 12, 19, 23 has the general shape of half a circle, thus they have a general semi-circular form. The sleeve elements 3, 12, 19, 23 have different designs depending on the intended use of each separate sleeve element 3, 12, 19, 23. Thus, the sleeve elements 3, 12, 19, 23 are of slightly different types. Two sleeve elements 3, 12, 19, 23 are placed together to form a full circle. A number of such full circles formed by two sleeve elements 3, 12, 19, 23 are then placed on top of each other to form the sleeve 1. Thus, the sleeve 1 can be said to be a modular openable sleeve, having a number of layers formed of the sleeve elements 3, 12, 19, 23. The number of sleeve elements 3, 12, 19, 23 placed on top of each other depend on the demands of the sleeve 1 in each specific case. Normally, different types of sleeve elements 3, 12, 19, 23 are used to form each sleeve 1. The layers of sleeve elements of a sleeve 1 may be of different type or may be identical. For example, the sleeve 1 comprises at least two or at least three layers of sleeve elements 3, 12, 19, 23. For example, the two sleeve elements of a specific layer are identical. Alternatively, a specific layer of sleeve elements comprises two different sleeve elements.

In other embodiments the sleeve elements have other general shapes than that of half a circle. Other general shapes may be half an oval, half a rectangle or other polygon. The opening of the split plate 2 will normally have a corresponding general shape.

The different shown sleeve elements 3, 12, 19, 23 will now be described more closely. A first sleeve element 3 has a base 4 at opposite ends. The bases 4 of two first sleeve elements 3 are to abut each other when forming a full circle. On the side of each base 4 opposite the side to abut another base 4, there is a recess 5. Further, the first sleeve element 3 has two fastening ears 6, placed at a distance from respective base 4 and directed outwards, so that there will be four such fastening ears 6 directed outwards of the full circle formed of two first sleeve elements 3 placed abutting each other. Each fastening ear 6 has an opening 7. The purpose of said fastening ears 6 and openings 7 will be explained further below. Each first sleeve element 3 has two joining ears 8 placed at a further distance from the bases 4 than the fastening ears 6 described above. Each joining ear 8 is also directed outwards and has an opening 9. The purpose of said joining ears 8 and said openings 9 will be explained further below. Finally, each first sleeve element 3 has one fastening ear 10 placed at the centre of the first sleeve element 1 opposite the bases 4. Said one fastening ear 10 is directed outwards and has an opening 11. The purpose of said fastening ear 10 and the opening 11 will be explained further below.

A second sleeve element 12 differs from the first sleeve element 3 in that it has no parts corresponding with the two fastening ears 6, each placed a distance from the base 4, of the first sleeve element 3. Thus, the second sleeve element 12 has two bases 13, each having a recess 14, two joining ears 15, each with an opening 16, and one fastening ear 17 placed at the centre of the second sleeve element 12 and having an opening 18.

A third sleeve element 19 has a base 20 at opposite ends of the third sleeve element 19. Each base 20 only protrudes a short distance out of the third sleeve element 19. Further the third sleeve element 19 has two joining ears 21 placed at a distance from the base 20. The two joining ears 21 are directed outwards and each having an opening 22.

A fourth sleeve element 23 has a base 24 at opposite ends. Each base 4 has a recess 25 on a side opposite a side to abut a base 24 of another fourth sleeve element 23. The fourth sleeve element 23 has further two joining ears 26 placed at a distance from the bases 24. The joining ears 26 are directed outwards and each has an opening 27.

Further, the sleeve 1 has straight connecting plates 28. Each connecting plate 28 has openings 29 at opposite ends.

A number of full circles of first sleeve elements 3, second sleeve elements 12, third sleeve elements 19 and/or fourth sleeve elements 23 are placed stacked on top of each other. The joining ears 8, 15, 21, 26 of said sleeve elements 3, 12, 19, 23 are placed in line with each other so that the openings 9, 16, 22, 27 of said joining ears 8, 15, 21, 26 will form through openings. A screw 30*a*, 30*b* is received in each of said formed through openings. Each screw 30*a*, 30*b* has a thread for cooperation with a thread of an opening of outermost sleeve elements. Thus, by means of said screws 30*a*, 30*b* a number of sleeve elements 3, 12, 19, 23 will be held together in a stack.

The bases 4, 13, 20, 24 of the sleeve elements 3, 12, 19, 23 are also placed in line with each other such that the recesses 5, 14, 25 of the bases 4, 13, 24 having recesses will be placed in line. Thus a stack of sleeve elements 3, 12, 19, 23 will have two lines of recesses, which recesses are to receive the connecting plates 28. Two stacks of such sleeve elements 3, 12, 19, 23, such as two identical stacks, are then brought together and fastened to each other by means of screws 31 and nuts 32, which screws 31 goes through the openings 29 of connecting plates 28 placed at opposite side of base parts of the stacks of sleeve elements. To give room for the screws 31 to pass the bases of the sleeve elements, the third sleeve elements 19 are placed at the positions of the stacks of sleeve elements where the screws 31 are placed.

The first fastening ears 6 and the second fastening ears 10 of the first sleeve element 3 are intended for fastening to the split plate 2. The fastening ear 17 of the second sleeve element 12 is intended for fastening of the seal, whereby normally a part of a bracket (not shown) is fastened to the fastening ear 17 and another part of the bracket is fastened to the seal.

As indicated above the sleeve elements 3, 12, 19, 23 can be combined in different ways to form sleeves. In FIGS. 3 to 8 there are three examples of differently formed sleeves 1*a*, 1*b*, 1*c*.

Figure 3:
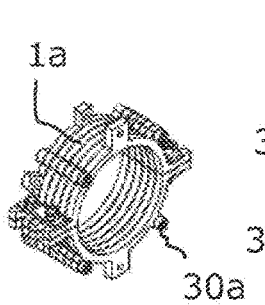
FIG. 3 is a perspective view of a first embodiment of a modular sleeve according to the present invention.
Figure 4:
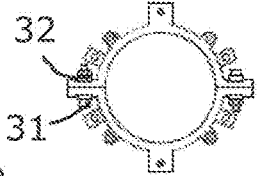
FIG. 4 is an end view of the modular sleeve of FIG. 3.

The sleeve 1*a* of FIGS. 3 and 4 has two first sleeve elements 3 at one end and two second sleeve elements 12 at the opposite end of the sleeve 1*a*. Four third and fourth sleeve elements 19, 23, respectively, are placed between the first and second sleeve elements 3, 12 placed at opposite ends of the sleeve 1*a*. As indicated above the sleeve 1*a* is attached to the split plate 2 by means of screws received in the openings 7, 11 of the first fastening ears 6 and the second fastening ears 10, respectively, of the first sleeve elements 3 placed abutting the split plate 2, and said screws are also received in threaded openings of the split plate 2.

Figure 5:
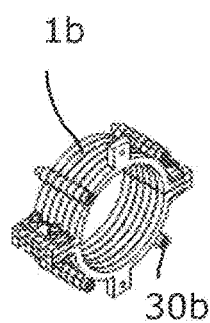
FIG. 5 is a perspective view of a second embodiment of a modular sleeve according to the present invention.
Figure 6:
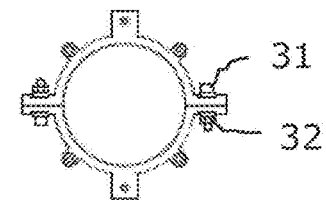
FIG. 6 is an end view of the modular sleeve of FIG. 5.

The sleeve 1*b* of FIGS. 5 and 6 has two second sleeve elements 12 at one end and two fourth sleeve elements 23 at the opposite end of the sleeve 1*b*. Two third sleeve elements 19 are placed adjacent each of the sleeve elements at the opposite ends of the sleeve 1*b*. Finally, four fourth sleeve elements 23 are placed in the middle between the third sleeve elements 19. The sleeve 1*b* is attached to the split plate 2 by means of the screws 30*b* holding each half of the sleeve 1*b* together. Said screws 30*b* protrude with a threaded end at the side of the sleeve 1*b* to be placed against the split plate 2, whereby said protruding end of each screw 30*b* is to be received in a threaded opening of the split plate 2.

Figure 7:
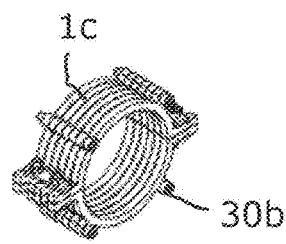
FIG. 7 is an end view of a third embodiment of a modular sleeve according to the present invention.
Figure 8:
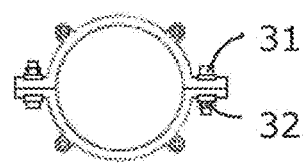
FIG. 8 is an end view of the modular sleeve of FIG. 7.
Figure 9:
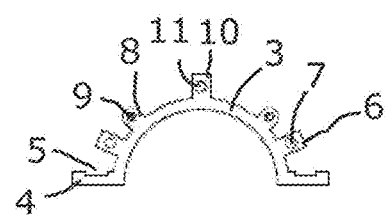
FIG. 9 is a side view of a first sleeve element forming a part of a modular sleeve according to the present invention.
Figure 10:
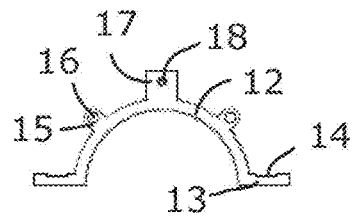
FIG. 10 is a side view of a second sleeve element forming a part of a modular sleeve according to the present invention.
Figure 11:
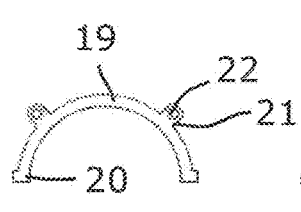
FIG. 11 is a side view of a third sleeve element forming a part of a modular sleeve according to the present invention.
Figure 12:
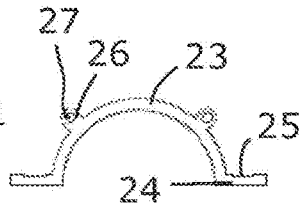
FIG. 12 is a side view of a fourth sleeve element forming a part of a modular sleeve according to the present invention.
Figure 13:
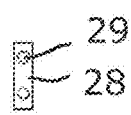
FIG. 13 is a plan view of a connecting plate forming a part of a modular sleeve according to the present invention.

The sleeve 1c of FIGS. 7 and 8 has four fourth sleeve elements 23 at opposite ends and four fourth sleeve elements 23 in the middle of the sleeve 1c. Further, there are two third sleeve elements 19 adjacent each of the sleeve elements at the opposite ends of the sleeve 1c. The sleeve 1c is attached to the split plate 2 by means of the screws 30b holding each half of the sleeve 1c together. Said screws 30b protrude with a threaded end at the side of the sleeve 1c to be placed against the split plate 2, whereby said protruding end of each screw 30b is to be received in a threaded opening of the split plate 2.

All of the above sleeves 1a, 1b, 1c have six layers of sleeve elements, but a person skilled in the art realises that also sleeve having other number of layers can be formed.

Figure 14:
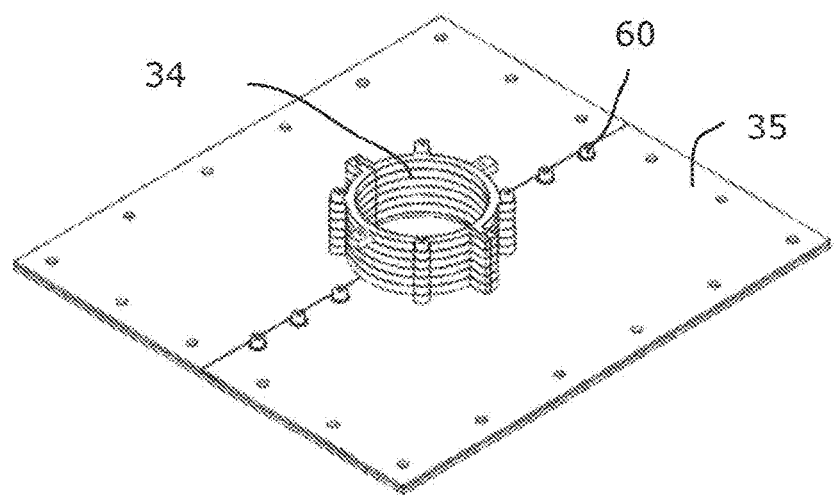
FIG. 14 is a perspective view of a combination of plate and modular sleeve.
Figure 15:
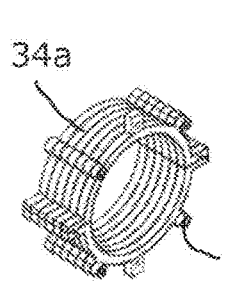
FIG. 15 is a perspective view of a fourth embodiment of a modular sleeve according to the present invention.
Figure 16:
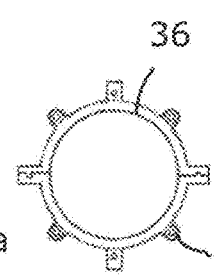
FIG. 16 is an end view of the modular sleeve of FIG. 15.
Figure 17:
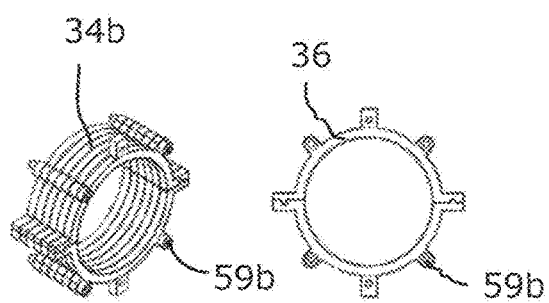
FIG. 17 is a perspective view of a fifth embodiment of a modular sleeve according to the present invention.

In FIG. 14 a further example of a sleeve 34 is shown, which sleeve 34 is attached to a split plate 35. In FIGS. 15 and 16 a first embodiment of a modular sleeve 34a to be used in the arrangement of FIG. 14 is shown. In FIG. 17 a second embodiment of a modular sleeve 34b to be used in the arrangement of FIG. 14 is shown.

The split plate 35 corresponds with the split plate 2 described above. Thus, the plate parts are connected to each other in an overlap joint by screw means 60. Each plate part of the split plate 35 has a semi-circular recess on the side to be facing the other plate part. Thus, a circular opening is formed in the split plate 35. In the same way as described above for the split plate 2, the opening of the split plate 35 and cooperating sleeves can have other general shapes than circular.

The sleeve 34 is formed of three different types of sleeve elements, each having the general form of a half circle. A fifth sleeve element 36 has a first base 37 at one end of the fifth sleeve element 36 and a second base 43 at the opposite end of the fifth sleeve element 36. The first base 37 has a groove 38 at a lower side and the second base 43 has a point 44 at a lower side. The fifth sleeve element 36 has two joining ears 39 placed at a distance from the first base 37 and the second base 43, respectively. The joining ears 39 are directed outwards from the fifth sleeve element 36 and each joining ear 39 has an opening 40. A fastening ear 41 is placed in the middle of the fifth sleeve element 36 between the first base 37 and the second base 43, respectively. The fastening ear 41 is directed outwards and has an opening 42 When two fifth sleeve elements 36 are placed to form a full circle, the point 44 of the second base 43 of one of the fifth sleeve element 36 are placed in the groove 38 of the first base 37 of the other fifth sleeve element 36 and vice versa.

A sixth sleeve element 45 has a first base 46 at one end of the sixth sleeve element 45 and a second base 50 at the opposite end of the sixth sleeve element 45. The first base 46 has a groove 47 at a lower side and the second base 50 has a point 51 at a lower side. The sixth sleeve element 45 has two joining ears 48 placed at a distance from the first base 46 and the second base 50, respectively. The joining ears 48 are directed outwards from the sixth sleeve elements 45 and each joining ear 48 has an opening 49. When two sixth sleeve elements 45 are placed to form a full circle, the point 51 of the second base 50 of one of the sixth sleeve elements 45 are placed in the groove 47 of the first base 46 of the other sixth sleeve element 45 and vice versa.

A seventh sleeve element 52 has a first base 53 at one end of the seventh sleeve element 52 and a second base 57 at the opposite end of the seventh sleeve element 52. The first base 53 has a groove 54 at a lower side and the second base 57 has a point 58 at a lower side. The seventh sleeve element 52 has two joining ears 55 placed at a distance form the first base 53 and the second base 57, respectively. The joining ears 55 are directed outwards from the seventh sleeve element 52 and each joining ear 55 has an opening 56. When two seventh sleeve elements 52 are placed to form a full circle, the point 58 of the second base 57 of one of the seventh sleeve elements 52 are placed in the groove 54 of the first base 53 of the other seventh sleeve element 52 and vice versa.

The sixth sleeve element 45 and the seventh sleeve element 52 differ in that the openings 56 of the joining ears 55 of the seventh sleeve elements 52 have an inner thread, while the openings 49 of the joining ears 48 of the sixth sleeve elements 45 have no threads.

A number of full circles of the fifth sleeve elements 36, the sixth sleeve elements 45 and the seventh sleeve elements 52 are placed stacked on top of each other. The joining ears 39, 48, 55 of said sleeve elements 36, 45, 52 are placed in line with each other in such a way that the openings 40, 49, 56 of said joining ears 39, 48, 55 will form through openings. A screw 59a, 59b is received in each of said through openings. Each screw 59a 59b has a thread for cooperation with the threaded openings 56 of the seventh sleeve elements 52, forming an outermost sleeve element of the sleeve 34a, 34b. Thus, by means of said screws 59a, 59b a number of sleeve elements 36, 45, 52 will be held together in a stack.

The fastening ear 41 of the fifth sleeve element 36 is intended for fastening of the seal, whereby normally a part of a bracket (not shown) is fastened to the fastening ear 41 and another part of the bracket is fastened to the seal.

The shown sleeve 34 has six layers of sleeve elements, but a person skilled in the art realises that also sleeves having other number of layers can be formed.

By means of the split plate and the sleeve formed of two halves, it can be installed around an existing cable, pipe or wire.

The sleeve 34a of FIGS. 15 and 16 has two fifth sleeve elements 36 at one end and two seventh sleeve elements 52 at the opposite end of the sleeve 34a. Eight sixth sleeve elements 45 are placed between the fifth and sixth sleeve elements 36, 52, respectively, at the opposite ends of the sleeve 34a. The sleeve 34a is attached to the split plate 35 by means of the seal. The attachment is achieved in that an elastic body of the seal protrudes on the side of the split plate 35 opposite the side receiving the seal 34a. As the seal is compressed parts of the elastic body of the seal will expand outside the opening of the split plate 35 on the side opposite the sleeve 34a. The other end of the seal is attached to the fastening ears 41 of the fifth sleeve elements 36, as indicated above.

Figure 18:
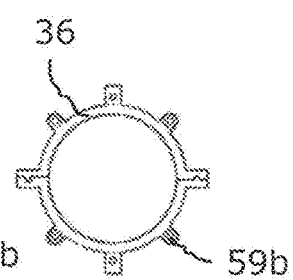
FIG. 18 is an end view of the modular sleeve of FIG. 17.
Figure 19:
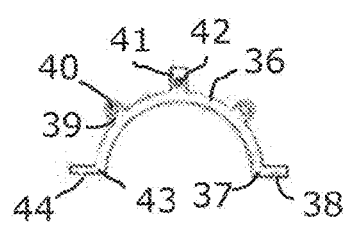
FIG. 19 is a side view of a fifth sleeve element forming a part of a modular sleeve according to the present invention.
Figure 20:
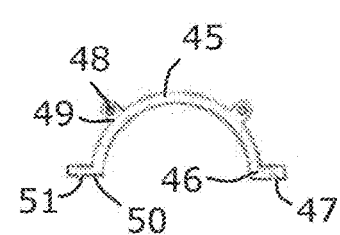
FIG. 20 is a side view of a sixth sleeve element forming a part of a modular sleeve according to the present invention.
Figure 21:
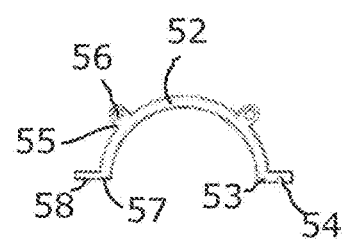
FIG. 21 is a side view of a seventh sleeve element forming a part of a modular sleeve according to the present invention.

The sleeve 34b of FIGS. 17 and 18 has two fifth sleeve elements 36 at one end and two seventh sleeve elements 52 at the opposite end of the sleeve 34b. Eight sixth sleeve elements 45 are placed between the fifth and sixth sleeve elements 36, 52, respectively, at the opposite ends of the sleeve 34b. The sleeve 34b is attached to the split plate 35 by means of the screws 59b holding each half of the sleeve 34b together. Said screws 59b protrude with a threaded end at the side of the sleeve 34b to be placed against the split plate 35, whereby said protruding end of each screw 59b is to be received in a threaded opening of the split plate 35.

To install the split plate 2, 35 with the sleeve 1, 34 at the partition, the two plate parts of the split plate 2, 35 are fastened to the partition in such a way that one or more cables, pipes or wires, going through an opening in the transition, are placed in the opening formed when the two plate parts are placed next to each other with the parts of the opening in line with each other. The plate parts are then attached to each other and to the transition by screw means.

A normal way of forming the sleeve 1, 34 is to first form two stacks of semi-circular sleeve elements, such as two identical stacks or two stacks with different designs. After forming two such stacks of semi-circular sleeve elements they are placed surrounding the one or more cables, pipes or wires received in the opening of the split plate 2, 35. The two sleeve halves are then connected to each other, forming the sleeve, and are then attached to the split plate 2, 35. Finally, an openable seal is placed in the sleeve 1, 34 to sealingly hold the one or more cables, pipes or wires received in the opening formed inside the sleeve 1, 34.

In the shown embodiments of FIGS. 1 and 14, the two halves of each sleeve 1, 34 are brought together along an imaginary line that is perpendicular to the sides of the plate parts joined together in each formed split plate 2, 35.

A person skilled in the art realises that also sleeve elements of other design than exactly the ones shown in the enclosed FIGS. can be provided. The exact design of the sleeve elements depends on the intended function of the sleeve. Further, as indicated above the number of stacked sleeve elements may be varied, to vary the height of the formed sleeves.

It is possible to attach the sleeve to earth, for instance at a fastening ear, to shield a cable or the like.

The invention claimed is:

1. Combination of a plate and a sleeve to be received at an opening of a transition, whereby the sleeve has a through opening to be placed in line with the opening of the transition, and whereby the through opening of the sleeve is adapted to receive a seal, wherein the plate is a split plate formed of two plate parts, that the plate parts are joined next to each other, that each plate part has a part of an opening, wherein said parts of an opening are placed to form an opening when the plate parts are joined, and that the through opening of the sleeve is placed in line with the opening formed of the parts of the opening of the plate parts placed next to each other,
wherein the sleeve is a modular sleeve formed of a plurality of layers, wherein each layer is formed of two sleeve elements, wherein the sleeve elements of each layer are brought together to form the through opening of the sleeve, and
wherein each sleeve element has two joining ears, with openings, wherein the openings of the joining ears are placed in line with openings of joining ears of each layer of the sleeve, wherein screws is received in said opening of the joining ears of the sleeve elements and wherein at least the sleeve elements at one end of the sleeve have threaded openings for cooperation with threads of the screws.

2. The combination of claim 1, wherein the two plate parts of the split plate are joined together by screw means, wherein the plate parts of the split plate are joined to each other by means of an overlap joint, and/or wherein the sleeve is fastened to the split plate by screw means.

3. The combination of claim 1, wherein at least two sleeve elements have one or more fastening ears, with an opening, for fastening to the split plate by means of screws.

4. The combination of claim 1, wherein at least two sleeve elements have two fastening ears, with an opening, for fastening of the seal.

5. The combination of claim 1, wherein the screws holding the sleeve together have threaded ends protruding outside the sleeve, which threaded ends are to be received in threaded openings of the split plate.

6. The combination of claim 1, wherein the sleeve elements of a specific layer of the sleeve are identical.

7. The combination of claim 1, wherein the opening of the split plate and the through opening of the sleeve each has a circular shape.

8. A sleeve formed of a number layers, wherein each layer is formed of two sleeve elements, that each sleeve element used to form the layers of the sleeve has a general form by means of which an opening is formed when two sleeve elements of each layer are brought together,
wherein each sleeve element has two joining ears, with openings, wherein the openings of the joining ears are placed in line with openings of joining ears of each layer of the sleeve, wherein screws is received in said opening of the joining ears of the sleeve elements and wherein at least the sleeve elements at one end of the sleeve have threaded openings for cooperation with threads of the screws.

9. The sleeve of claim 8, wherein each sleeve element has a base at opposing ends and wherein said bases are to be placed abutting bases of another sleeve element when forming a layer of the sleeve.

10. The sleeve of claim 9, wherein each of at least four sleeve elements, forming at least two separate layers of the sleeve, has a recess on the side of each base to be facing away from the other sleeve element of each layer, which recesses are placed in line with each other to receive a connecting plate.

11. The sleeve of claim 10, wherein at least two sleeve elements have bases that are shorter than the bases of the other sleeve elements having recesses, in order to give room for screws received in openings of the connecting plates received opposite each other in the recesses of the other sleeve elements of the sleeve.

12. The sleeve of any of the claim 9, wherein one of the bases of each sleeve element has a groove and the other base has a point, and wherein the groove of one of the bases of one sleeve element is to receive the point of one of the bases of another sleeve element when two sleeve elements are brought together to form a layer of the sleeve.

13. The sleeve of claim 8, wherein the sleeve comprises two halves, wherein each half comprises a number of sleeve elements placed on top of each other, and wherein the two halves are brought together to form the sleeve.

14. The sleeve of claim 13, wherein the two halves of the sleeve are identical.

15. The sleeve of claim 8, wherein the sleeve comprises at least three layers of sleeve elements.

16. The sleeve of claim 8, wherein the sleeve is a modular sleeve formed of the layers of sleeve elements.

17. The sleeve of claim 8, wherein the sleeve elements of a specific layer of the sleeve are identical.

18. Combination of a plate and a sleeve to be received at an opening of a transition, whereby the sleeve has a through opening to be placed in line with the opening of the transition, and whereby the through opening of the sleeve is adapted to receive a seal, wherein the plate is a split plate formed of two plate parts, that the plate parts are joined next to each other, that each plate part has a part of an opening, wherein said parts of an opening are placed to form an opening when the plate parts are joined, and that the through opening of the sleeve is placed in line with the opening formed of the parts of the opening of the plate parts placed next to each other,
wherein the sleeve is a modular sleeve formed of a plurality of layers, wherein each layer is formed of two sleeve elements, wherein the sleeve elements of each layer are brought together to form the through opening of the sleeve, and wherein at least two sleeve elements have one or more fastening ears, with an opening, for fastening to the split plate by means of screws.

* * * * *